US009612934B2

(12) United States Patent
Dobbie et al.

(10) Patent No.: US 9,612,934 B2
(45) Date of Patent: Apr. 4, 2017

(54) NETWORK PROCESSOR WITH DISTRIBUTED TRACE BUFFERS

(75) Inventors: Bradley D. Dobbie, Boston, MA (US); David H. Asher, Sutton, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 255 days.

(21) Appl. No.: 13/284,289

(22) Filed: Oct. 28, 2011

(65) Prior Publication Data

US 2013/0111073 A1 May 2, 2013

(51) Int. Cl.
| | |
|---|---|
| *G06F 3/00* | (2006.01) |
| *G06F 11/34* | (2006.01) |
| *G06F 13/40* | (2006.01) |
| *G06F 12/084* | (2016.01) |
| *G06F 3/16* | (2006.01) |
| *G06F 1/32* | (2006.01) |
| *G06F 13/38* | (2006.01) |

(52) U.S. Cl.
CPC ........ *G06F 11/3495* (2013.01); *G06F 11/349* (2013.01); *G06F 12/084* (2013.01); *G06F 13/4022* (2013.01); *G06F 1/3203* (2013.01); *G06F 3/16* (2013.01); *G06F 13/385* (2013.01)

(58) Field of Classification Search
CPC ........ G06F 1/3203; G06F 13/385; G06F 3/16
See application file for complete search history.

(56) References Cited

U.S. PATENT DOCUMENTS

| | | | | |
|---|---|---|---|---|
| 6,145,123 | A  * | 11/2000 | Torrey et al. | ................ 717/128 |
| 6,223,228 | B1 * | 4/2001 | Ryan et al. | .................. 713/375 |
| 6,240,509 | B1 * | 5/2001 | Akkary | ................ G06F 9/3842 |
| | | | | 711/207 |
| 6,247,121 | B1 * | 6/2001 | Akkary et al. | ................ 712/239 |
| 6,315,530 | B1 * | 11/2001 | Goodnick et al. | ......... 417/424.1 |
| 6,611,879 | B1 * | 8/2003 | Dobecki | .......................... 710/1 |
| 6,681,321 | B1 * | 1/2004 | Dale | .................. G06F 11/3636 |
| | | | | 712/227 |
| 6,834,365 | B2 * | 12/2004 | Bardsley et al. | ............... 714/45 |
| 7,340,564 | B2 * | 3/2008 | Twomey | ...................... 711/125 |
| 7,359,994 | B1 * | 4/2008 | Lakhanpal et al. | .............. 710/5 |
| 7,536,669 | B1 * | 5/2009 | Anderson | ..................... 716/138 |
| 2001/0032297 | A1 * | 10/2001 | Morikawa et al. | .......... 711/133 |
| 2006/0224928 | A1 * | 10/2006 | Cardinell | ............ G06F 11/3476 |
| | | | | 714/45 |

(Continued)

OTHER PUBLICATIONS

"Cavium Networks Unveils OCTEON II CN68XX—Industry's Highest-Performance Multi-Core Processors for Energy-Efficient Data Center, Mobile Internet and the Borderless Enterprise" (May 10, 2010).

*Primary Examiner* — Henry Tsai
*Assistant Examiner* — Aurangzeb Hassan
(74) *Attorney, Agent, or Firm* — Hamilton, Brook, Smith & Reynolds, P.C.

(57) ABSTRACT

A network processor includes a cache and a several groups of processors for accessing the cache. A memory interconnect provides for connecting the processors to the cache via a plurality of memory buses. A number of trace buffers are also connected to the bus and operate to store information regarding commands and data transmitted across the bus. The trace buffers share a common address space, thereby enabling access to the trace buffers as a single entity.

12 Claims, 5 Drawing Sheets

(56) References Cited

U.S. PATENT DOCUMENTS

| | | | |
|---|---|---|---|
| 2006/0251416 A1* | 11/2006 | Letner et al. .................. 398/45 |
| 2007/0011492 A1* | 1/2007 | Swaine ............... G06F 11/3644 |
| | | | 714/35 |
| 2007/0067572 A1* | 3/2007 | Jiao et al. ..................... 711/125 |
| 2007/0162911 A1* | 7/2007 | Kohn et al. ................... 718/107 |
| 2011/0138124 A1* | 6/2011 | Hill ..................... G06F 11/3471 |
| | | | 711/122 |
| 2011/0173366 A1* | 7/2011 | Satterfield ........... G06F 11/3476 |
| | | | 710/305 |
| 2011/0219208 A1* | 9/2011 | Asaad .................... G06F 15/76 |
| | | | 712/12 |
| 2013/0042155 A1* | 2/2013 | Millet ................. G06F 11/3636 |
| | | | 714/45 |

* cited by examiner

NETWORK PROCESSOR WITH DISTRIBUTED TRACE BUFFERS

BACKGROUND

A Trace Buffer is typically implemented in a network processor to capture requests at a bus in transit between a processor core and a cache. A trace buffer typically records the address, command, and time information of these bus requests. Software can read out the recorded bus requests to generate a trace of the sequence of events observed by the trace buffer.

SUMMARY

Embodiments of the present invention provide for employing multiple trace buffers at respective memory buses to capture relevant information on commands transmitted along the bus. In one embodiment, a system includes a cache and a plurality of processor subsets configured to access the cache. Each processor subset may include a group of processors and a bus connecting the group of processors to the cache. The bus carries commands and data between the cache and the processors. Each processor subset may further include a trace buffer connected to the bus between the group of processors and the cache. The trace buffer is configured to store information regarding commands sent by the group of processors along the bus. Further, the trace buffers at each of the processor subsets may share a common address space, thereby enabling access to the trace buffers as a single entity.

In further embodiments, the system may include a control circuit at the bus between the groups of processors and the cache, the control circuit directing command and data signals between the processors and the cache. The trace buffer may be connected to the bus between the group of processors and the control circuit, or may be connected to the bus between the control circuit and the cache.

In still further embodiments, a system includes a cache having multiple banks and a control circuit configured to direct access requests to the banks. The system further includes a plurality of processor groups, each including a plurality of processors connected to the cache by a respective bus. A plurality of trace buffers are also provided to store information regarding commands sent by the plurality of processor groups. The plurality of trace buffers are adapted to be reconfigurable between a first mode and a second mode. In the first mode, each of the plurality of trace buffers are connected in the path of a different bus. In the second mode, the plurality of trace buffers is connected between the control circuit and plurality of banks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Before describing example embodiments of the present invention in detail, an example network security processor in which the embodiments may be implemented is described immediately below to help the reader understand the inventive features of the present invention.

Figure 1:
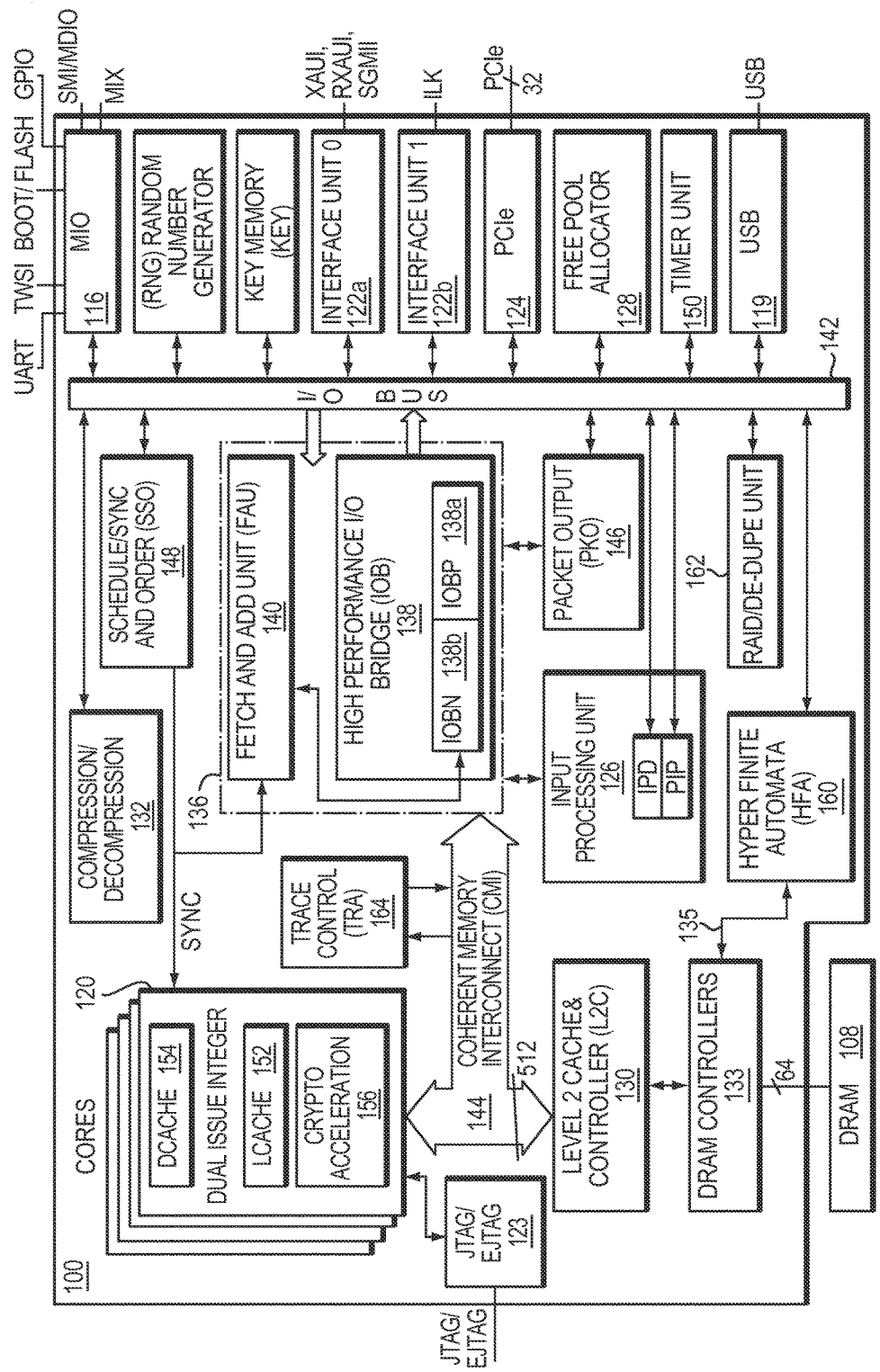
FIG. 1 is a block diagram illustrating a network services processor in which embodiments of the present invention may be implemented.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for Transmission Control Protocol (TCP)/ User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule, Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with a write-through policy. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the Level-1 data cache 154 from each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can support preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manage in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The HFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

A network processor 100 may implement a trace control unit 164 to capture commands and data at a bus between a processor core 120 and a memory (e.g., L2C 130). A trace control unit 164 includes a trace buffer to record the address, command, and time information of bus requests. This information captured by the trace buffer can be used to verify operation of the hardware (e.g., during post-silicon testing) and to debug the software executed by the processor cores. The type of transactions recorded can be controlled by programmable filtering and triggering rules. The trace buffer can further be programmed to notify software via a central interrupt unit (CIU) interrupt or Multi Core Debug (MCD) wire pulse when a bus request is captured or a buffer threshold is exceeded. A software program can then read out the recorded bus requests to generate a trace of the sequence of events observed by the trace buffer.

Typical network processors implement a single trace buffer to capture commands and data at a bus between a processor core and a memory. However, as the architecture of a memory bus and L2 cache increases in complexity, a single trace buffer may be insufficient. In particular, with reference to FIG. 1, if the processor cores 120 become segmented into multiple groups of processor, each group having a separate bus, and the L2 cache 130 is divided into multiple banks (each referred to as a "Tag And Data" or "TAD"), then the memory bus 144 becomes divided into several distinct buses, and there is no longer a single point along the bus 144 to capture command and data signals. The increased throughput of such a network processor may also overwhelm a single trace buffer. In one example embodiment, the network processor 100 may include 32 processor cores divided into 4 groups of 8 cores each, thereby requiring 4 memory buses each having distinct channels for carrying command, store and response signals. In order to the meet the bandwidth requirements for the 32 processor cores, the L2 cache may be divided into 4 banks (TADs). This distribution of the data array requires a 4-by-4 cross-bar between the buses and banks (described below with reference to FIGS. 2-5). Thus, a typical trace buffer may be insufficient for a multi-core, high-throughput network processor due to the limited capacity of the trace buffer and multiple buses carrying command and data signals.

Example embodiments of the present invention provide for a plurality of trace buffers at a memory interconnect having multiple buses. The trace buffers may share a common address space, thereby enabling access to the trace buffers as a single data entity. The location of the trace buffers with respect to the memory interconnect may be switched by a controller, thereby allowing the trace buffers to capture data and command signals at multiple points along the memory interconnect. As a result, command and data signals are captured at multiple separate buses, bandwidth and capacity of the trace buffers are optimized, and the operation of the processor cores and cache can be verified and diagnosed using data at multiple points along the memory interconnect.

Embodiments of the present invention may be implemented in the network services processor 100 shown in FIG. 1, and may be directed more particularly to the coherent memory interconnect (CMI) 144 and associated components, the processor cores 120, trace buffers and trace control circuit 164, and the Level 2 cache and controller (L2C) 130. Example embodiments are described in further detail below with reference to FIGS. 2-5.

Figure 2:
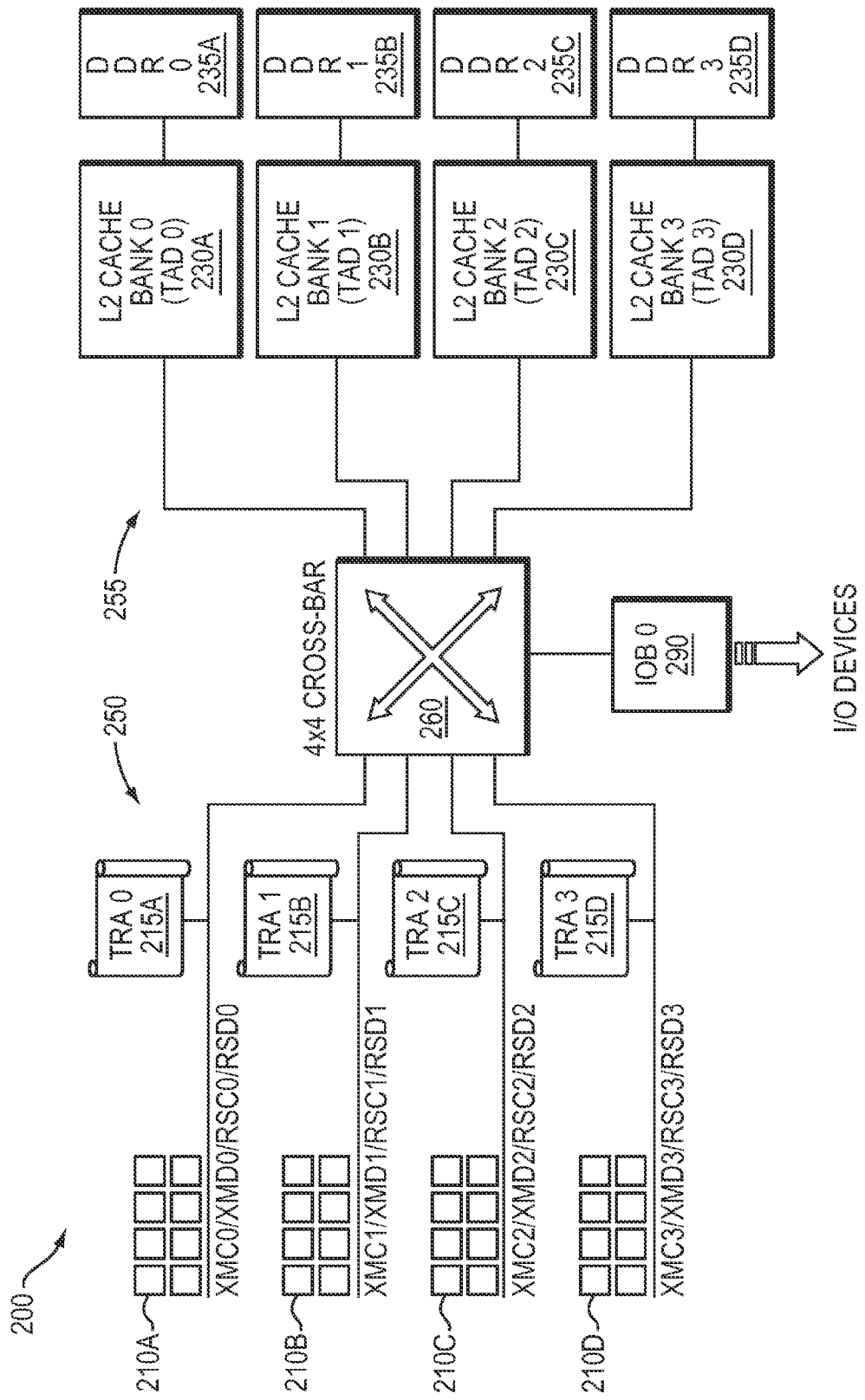
FIG. 2 is a block diagram of a circuit implementing trace buffers according to one embodiment.

FIG. 2 is a block diagram of a system 200 employing trace buffers according to one embodiment. The system 200 may be implemented as a subset of the network processor 100 described above with reference to FIG. 1, and in particular may be directed to a subset comprising the processor cores 120, the memory interconnect 144, the trace control unit 164 and the Level-2 (L2) cache 130. The system includes four processor core groups 210A-D, each group comprising eight processor cores. The processor groups 210A-D connect to a "cross bar" interconnect control circuit 260 via core-side buses 250. The core-side buses 250 may comprise a number of separate buses each linking a processor group 250A-D to the cross-bar control circuit 260, and is described in further detail below with reference to FIG. 4. Likewise, bank-side buses 255 may comprise a number of separate buses each connecting an L2 cache bank 230A-D (a "TAD") to the control circuit 260. Each of the banks 230A-D may further access a respective DRAM memory array 235A-D, which may be located external to the system (e.g., DRAM 108 in FIG. 1). The control circuit 260 receives signals at both the core-side and bank-side buses 250, 255, and routes those signals to the appropriate processor core group 210A-D or bank 230A-D based on an address, processor core ID or other information regarding the signals. The control circuit 260 may also enable connection, through one of the buses 250, 255, to an I/O bridge 290 for communication with one or more external I/O devices (e.g., I/O bridge 138 for accessing devices on I/O bus 142 in FIG. 1).

In a memory access operation, a processor (e.g., a processor in group 210A) transmits a command through a core-side bus 250 to the control circuit 260. The command may be, for example, a memory read command (also referred to as a "request"), which specifies an address of the data to be read from one of the banks 230A-D. Based on the received address, the control circuit 260 forwards the command, via a bank-side bus 255, to the particular bank (e.g., bank 230A) potentially storing the data at the specified address. If the receiving bank is storing the requested data, the bank in turn retrieves the requested data and forwards it, via the bank-side bus 255, to the control circuit 260, which in turn forwards the data via the core-side bus 250. If the receiving bank is not storing the requested data, the command may be forwarded to a local DRAM (e.g., DRAM 108 in FIG. 1) for retrieval of the data to the bank.

During the above transaction between a processor core and a bank, a trace buffer (e.g., trace buffer 215A) captures and stores information regarding the transaction. For example, the trace buffer may record the address, command, and time information of the processor core command requesting data, and may further record information regarding the data response provided by the bank. The trace buffers 215A-D may be components of a trace control unit (e.g., trace control unit 164 in FIG. 1), which is operable to export the collected information to another device or outside the network processor for control or diagnostic purposes. For example, information captured by the trace buffer can be used to verify operation of the hardware (e.g., during post-silicon testing) and to debug the software executed by the processor cores 210A-D. The type of transactions recorded by the trace buffers 215A-D can be controlled by programmable filtering and triggering rules. The trace buffer can further be programmed to issue a notification via a central interrupt unit (CIU) interrupt or MCD wire pulse when a bus request is captured or a buffer threshold is exceeded. A software program can then read out the recorded bus requests to generate a trace of the sequence of events observed by the trace buffer, thereby enabling the software program to review the transactions and conditions preceding the notification.

The trace buffers 215A-D may be configured such that they share a common address space accessed by external devices and software processes, thereby enabling access to the trace buffers as a single entity. This is accomplished, in part, by employing a single entity ID for the entirety of the trace buffers 215A-D, and by dividing the RSL address space between the trace buffers 215A-D. Thus, a software process may access a trace of a particular processor core by indicating an identifier for a particular trace buffer (e.g., TraID) and the originating processor core (e.g., TraCore). In this manner, access to the trace buffers 215A-D is simplified. Each trace buffer may further include an individual CIU interrupt and MCD0 wire for providing notifications as described above.

In the embodiment shown in FIG. 2, the trace buffers 215A-D are located at the core-side buses 250. In further embodiments described below, trace buffers may alternatively be located at the bank-side buses 255, or may be switchable between multiple locations. Operational differences between core-side and bank-side traces are described below with reference to FIG. 4.

Figure 3:
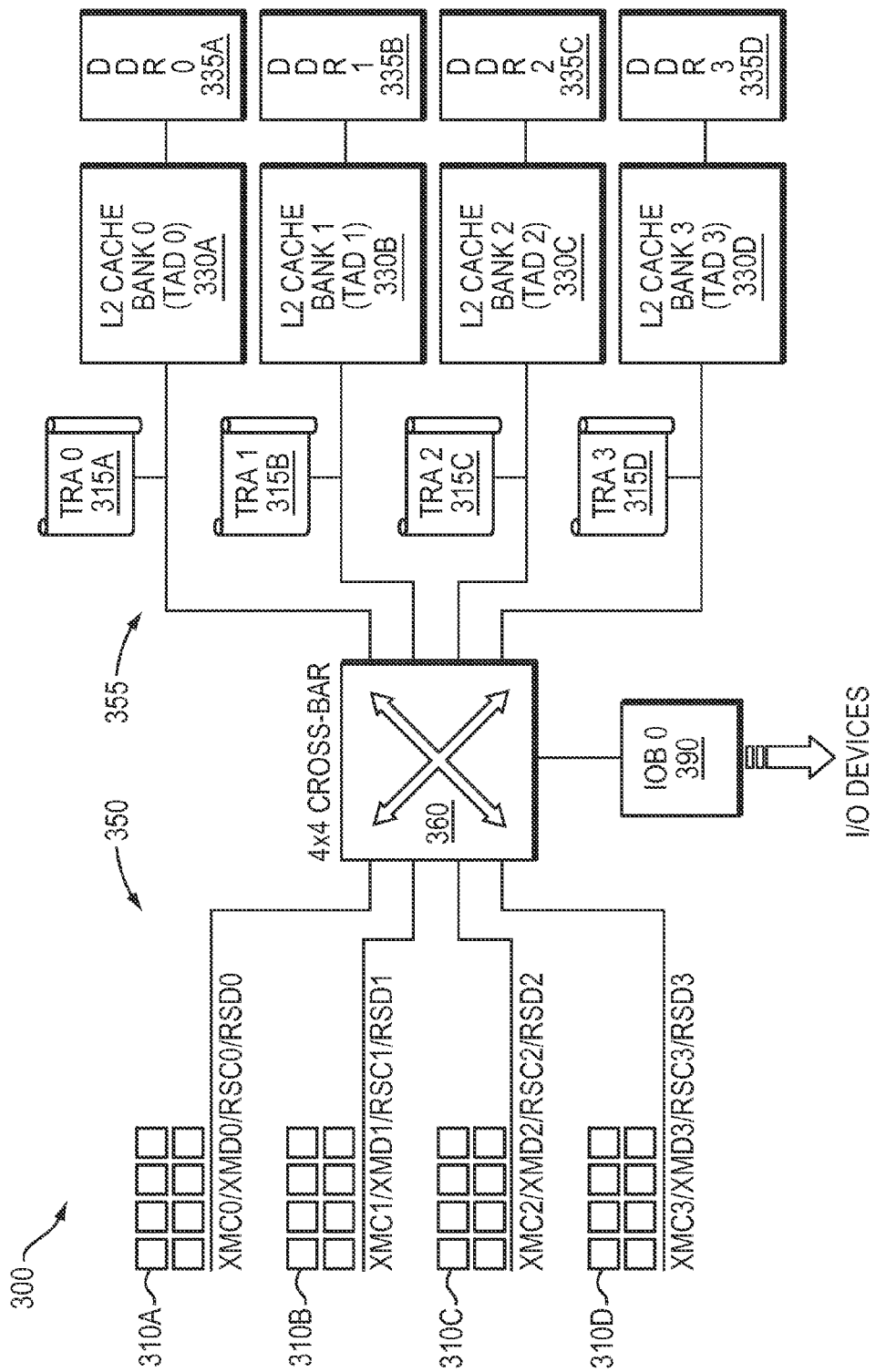
FIG. 3 is a block diagram of a circuit implementing trace buffers according to a further embodiment.

FIG. 3 is a block diagram of a system 300 employing trace buffers according to a further embodiment. The system 300 may be implemented as a subset of the network processor 100 described above with reference to FIG. 1, and in particular may be directed to a subset comprising the processor cores 120, the memory interconnect 144, the trace control unit 164 and the L2 cache 130. The system includes four processor core groups 310A-D, each group comprising eight processor cores. The processor groups 310A-D connect to a "cross bar" interconnect control circuit 360 via a core-side bus 350. The core-side buses 350 may comprise a number of separate buses each linking a processor group 350A-D to the control circuit 360, and is described in further detail below with reference to FIG. 4. Likewise, bank-side buses 355 may comprise a number of separate buses each connecting an L2 cache bank 330A-D (a "TAD") to the control circuit 360. Each of the banks 330A-D may further access a respective DRAM memory array 335A-D, which may be located external to the system (e.g., DRAM 108 in FIG. 1). The control circuit 360 receives signals at both the core-side and bank-side buses 350, 355, and routes those signals to the appropriate processor core group 310A-D or bank 330A-D based on an address or other information regarding the signals. The control circuit 360 may also enable connection, through one of the buses 350, 355, to an I/O bridge 390 for communication with one or more external I/O devices (e.g., I/O bridge 138 for accessing devices on I/O bus 142 in FIG. 1).

The system 300 may be configured in a manner similar to the system 200 described above with reference to FIG. 2. One difference between the systems 200, 300 is the placement of the trace buffers 315A-D, whereas the trace buffers 315A-D are located at the bank-side buses 355 rather than the core-side buses 350. In further embodiments described below, trace buffers may be switchable between multiple locations. Operational differences between core-side and bank-side traces are described below with reference to FIG. 4.

Figure 4:
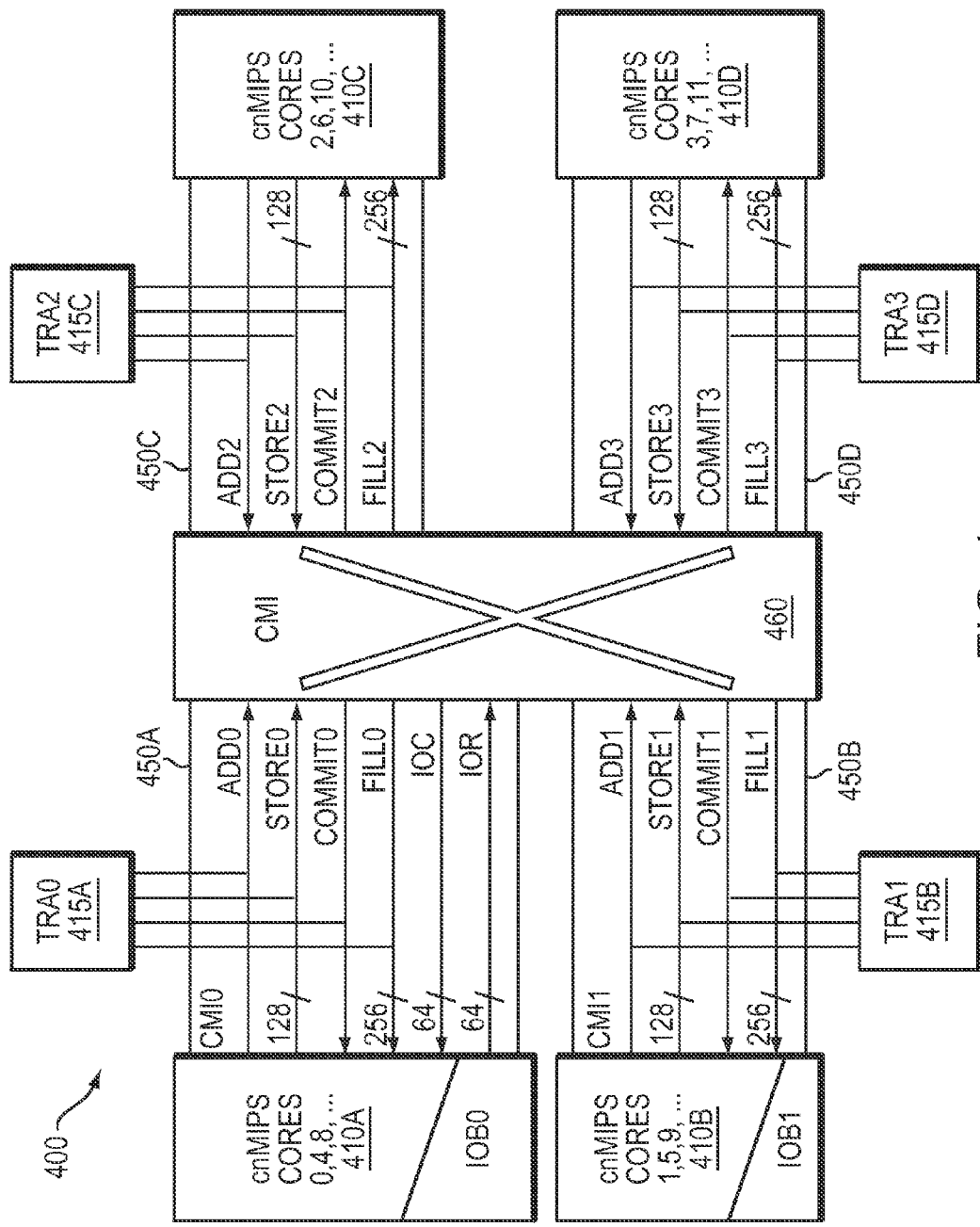
FIG. 4 is a block diagram illustrating configuration of a memory bus in one embodiment.

FIG. 4 illustrates configuration of a core-side memory bus in one embodiment. Specifically, the configuration in FIG. 4 is comparable to that of the core-side bus of the system 200 of FIG. 2, but is expanded to show the configuration of the bus in further detail. Accordingly, four processor core groups 410A-D each comprise eight processor cores, and the processor groups 410A-D connect to a "cross bar" interconnect control circuit 460 via core-side buses 450A-D. Each of the core-side buses 250A-D comprises a number of channels (ADD, STORE, COMMIT, and FILL), each channel carrying corresponding signals between the processors 410A-D and the control circuit 460. Bus 450A further includes additional channels (IOC, IOR) for carrying signals to and from an I/O bridge. In order to capture information on command and data signals, the trace buffers 415A-D are each configured at a respective bus 450A-D to detect signals at each of the relevant channels.

As described above with reference to FIGS. 2 and 3, trace buffers may be located at a core-side bus (FIGS. 2 and 4) or at a bank-side bus (FIG. 3). An embodiment employing bank-side TRA Trace Buffers can observe the final ordering of cache operations because the transactions are seen after arbitration between buses and quality-of-service (QOS) levels is done. In contrast, an embodiment using bus-side trace buffers can only observe ordering between transactions on a particular bus. One drawback of the bank-side solution is that it cannot capture bus operations on the IOC/IOR bus, which is used by processor cores to directly access devices on the Non-Coherent Bus (NCB). The IOC/IOR bus carries transactions to the NCB I/O Bridge (IOB0), instead of sending transactions to the L2C banks, and so such transactions cannot be detected by a bank-side trace buffer. The core-side embodiment can capture IOC/IOR bus operations because each IOC/IOR transaction has a corresponding XMC/XMD or RSC/RSD transaction.

A further distinction between the core-side and bank-side embodiments relates to how a processor core is associated with a trace buffer. In the bus-side solution, each processor core maps to a single bus group, therefore is associated with a single trace buffer r. In the bank-side solution, each trace buffer can observe a transaction from any of the 32 processor cores. A software process may have identified which processor core to trace, and so the bus-side embodiment may be advantageous such that a user only needs to read out recorded bus requests from a single trace buffer. In the bank-side solution, the bank (or trace buffer) is determined by the physical memory address of the operation, which may be difficult to determine during a debug scenario.

Figure 5:
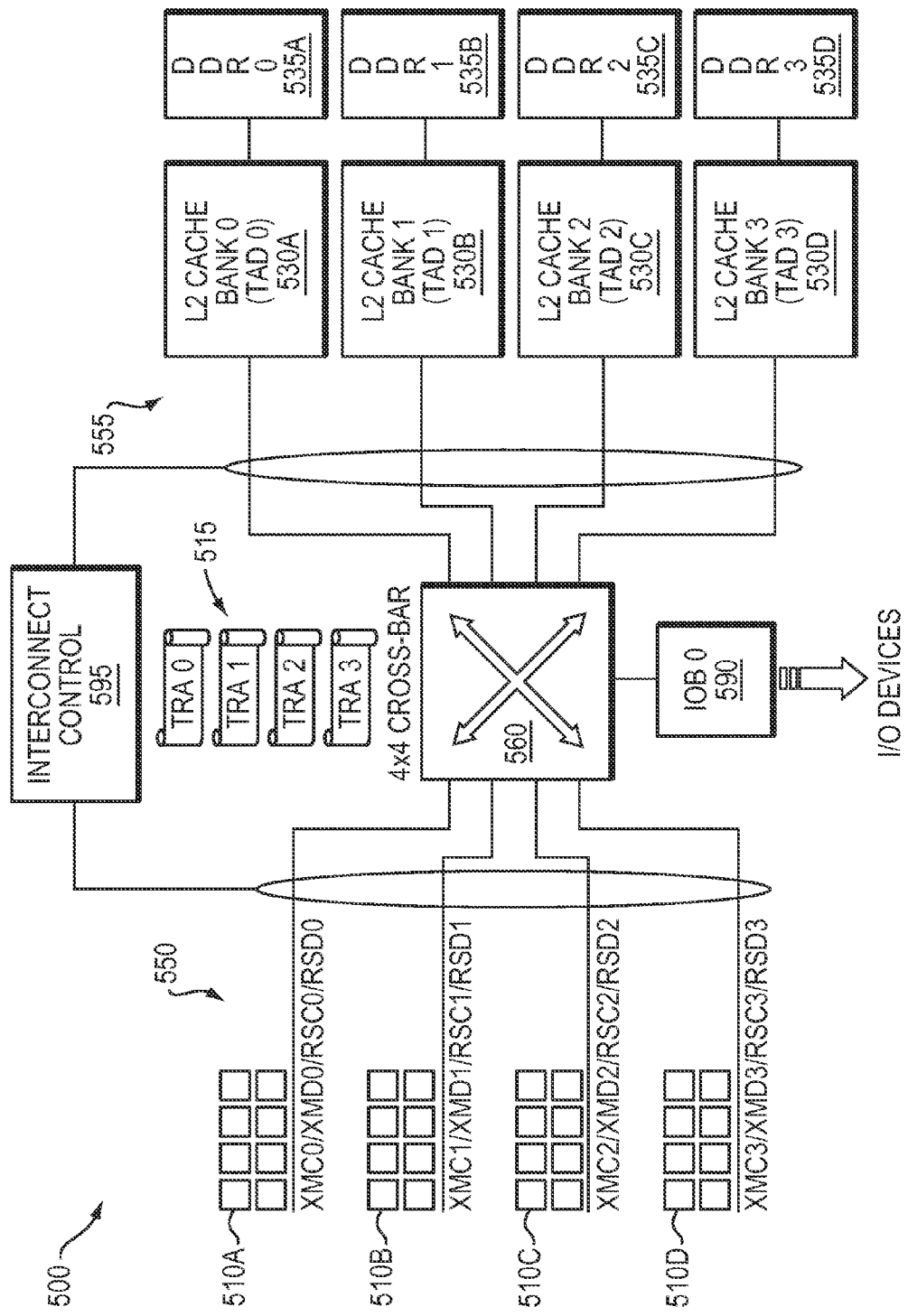
FIG. 5 is a block diagram of a circuit implementing trace buffers according to a further embodiment.

FIG. 5 is a block diagram of a system 500 employing trace buffers in a further embodiment, where the location of the trace buffers may be selectively switched. The system 500 may be implemented as a subset of the network processor 100 described above with reference to FIG. 1, and in particular may be directed to a subset comprising the processor cores 120, the memory interconnect 144, the trace control unit 164 and the L2 cache 130. The system includes four processor core groups 510A-D, each group comprising eight processor cores. The processor groups 510A-D connect to a "cross bar" interconnect control circuit 560 via core-side buses 550. The core-side buses 550 may comprise a number of separate buses each linking a processor group 550A-D to the control circuit 560, and is described in further detail below with reference to FIG. 4. Likewise, bank-side buses 555 may comprise a number of separate buses each connecting an L2 cache bank 530A-D (a "TAD") to the control circuit 560. Each of the banks 530A-D may further access a respective DRAM memory array 535A-D, which may be located external to the system (e.g., DRAM 108 in FIG. 1). The control circuit 560 receives signals at both the core-side and bank-side buses 550, 555, and routes those signals to the appropriate processor core group 510A-D or bank 530A-D based on an address or other information regarding the signals. The control circuit 560 may also enable connection, through one of the buses 550, 555, to an I/O bridge 590 for communication with one or more external I/O devices (e.g., I/O bridge 138 for accessing devices on I/O bus 142 in FIG. 1).

The trace buffers 515 are connected to an interconnect circuit 595, which in turn is routed to each of the core-side and bank-side buses 550, 555. The interconnect circuit 595 may be controlled by a software process or by a user to switch the trace buffers between core-side bus monitoring, thereby matching the configuration shown in FIG. 2, and bank-side bus monitoring, thereby matching the configuration shown in FIG. 3. This "hybrid" embodiment thus connects the trace buffers 515 to the four core-side buses and to the four bank-side buses, providing a total of eight points of observability.

The flexibility provided by this embodiment may support three software-controlled modes: (1) core observation mode (COM), (2) bank observation mode (BOM), and (3) hybrid observation mode (HOM). Operating in core observation mode has the same advantages and disadvantages of the bus-side embodiment described above (FIG. 2). Operating in bank observation mode has the same advantages and disadvantages of the bank-side embodiment described above (FIG. 3). The hybrid observation mode provides further opportunities for post-silicon verification and software debugging. For example, the hybrid mode may allow operations to be recorded both as they are seen on the core-side buses and as they are seen by the cache banks. The bus-side view and bank-side view can then be correlated to gain information about how the operations pass through the complex arbitration logic in the control circuit. This debug feature can help determine whether cache coherency and memory consistency are maintained by the hardware for a particular set of software code running on the network processor.

Depending on the nature of the issue a user is attempting to debug, either the core observation mode or bank observation mode may be most appropriate. However, under some applications, the operation mode of the network processor may not be able to be simplified while still being able to reproduce the failure.

An advantage of implementing the hybrid observation mode is the ability to use combined information from different points of observability for a single transaction. For example, the hybrid observation mode may be employed in a scenario where the quality of service (QOS) feature is not working correctly, due to either a hardware bug or software error. Multiple transactions with different QOS levels can be issued from different core-side buses, all targeted at the same cache-bank (TAD). Core-side traces can be used to gather information about when and whether the order commands arrive at particular core-side buses. Using this information, a set of legal bank-side orderings can be defined. Switching to bank-side tracing, the actual bank-side orderings may then be captured. The actual ordering can be compared with the legal set of orderings to discover a violation. One or more violations can be aggregated to debug the issue and identify a solution.

While this invention has been particularly shown and described with references to example embodiments thereof, it will be understood by those skilled in the art that various changes in form and details may be made therein without departing from the scope of the invention encompassed by the appended claims.

What is claimed is:
1. A system comprising:
  a cache; and
  a plurality of processor subsets configured to access the cache, each processor subset comprising:
  a group of processors;
  a bus, the groups connected to the cache via the respective bus, the bus carrying commands from the group of processors to the cache, the bus further carrying data between the cache and the processors; and
  a trace buffer connected to the bus between the group of processors and the cache, the trace buffer configured to store information regarding commands to access the cache sent by the group of processors along the bus to the cache, the information including address information, command information and command time information;
  the trace buffers at each of the processor subsets sharing a common address space to enable access to the trace buffers as a single entity.

2. The system of claim 1, further comprising a control circuit connected to the bus of each or the plurality of processor subsets, the control circuit configured to direct the command and data signals between the cache and the processors.

3. The system of claim 2, wherein the trace buffer of at least one of the plurality of processor subsets is connected to the bus between the respective processor and the control circuit.

4. The system of claim 2, wherein the trace buffer of at least one of the plurality of processor subsets is connected to the bus between the control circuit and the cache.

5. The system of claim 1, wherein the trace buffer is configured to issue a notification through at least one of a central interrupt unit (CIU) and a wire pulse in response to an event.

6. The system of claim 5, wherein the event is one or more of a captured command signal and an exceeding of a buffer threshold.

7. The system of claim 1, wherein the trace buffers at each of the processor subsets are configured with a common entity identifier, the address space associated with the entity identifier being divided among the trace buffers.

8. A system comprising:
  a cache having a plurality of banks and a control circuit configured to direct access requests to the plurality of banks;
  a plurality of processor groups, each of the processor groups including a plurality of processors connected to the cache by a respective bus, the bus carrying commands from the group of processors to the cache, the bus further carrying data between the cache and the processors; and
  a plurality of trace buffers configured to store information regarding commands to access the cache sent by the plurality of processor groups along the bus to the cache, the information including address information, command information and command time information;
  the plurality of trace buffers being adapted to be reconfigurable between a first mode and a second mode, the first mode placing each of the plurality of trace buffers in the path of a different bus between the plurality of processor groups and the control circuit, the second mode placing the plurality of trace buffers between the control circuit and plurality of banks.

9. The system of claim 8, wherein the plurality of trace buffers share a common address space to enable access to the trace buffers as a single entity.

10. The system of claim 8, wherein the plurality of trace buffers are configured to issue a notification through at least one of a central interrupt unit (CIU) and a wire pulse in response to an event.

11. The system of claim 10, wherein the event is one or more of a captured command signal and an exceeding of a buffer threshold.

12. The system of claim 8, wherein the plurality of trace buffers are configured with a common entity identifier, the address space associated with the entity identifier being divided among the trace buffers.

* * * * *